US012767120B2

(12) United States Patent
Sadiq

(10) Patent No.: US 12,767,120 B2
(45) Date of Patent: Oct. 20, 2026

(54) MITIGATING HIGH FAULT ENERGY IN DUAL-WOUND PERMANENT MAGNET SYNCHRONOUS MOTOR DRIVE HYBRID-ELECTRIC PROPULSION SYSTEM

(71) Applicant: Hamilton Sundstrand Corporation, Charlotte, NC (US)

(72) Inventor: Muhammad Nouman Sadiq, Solihull (GB)

(73) Assignee: Hamilton Sundstrand Corporation, Charlotte, NC (US)

( * ) Notice: Subject to any disclaimer, the term of this patent is extended or adjusted under 35 U.S.C. 154(b) by 240 days.

(21) Appl. No.: 18/795,691

(22) Filed: Aug. 6, 2024

(65) Prior Publication Data

US 2026/0042440 A1 Feb. 12, 2026

(51) Int. Cl.

| | |
|---|---|
| ***B60W 10/00*** | (2006.01) |
| ***B60W 10/02*** | (2006.01) |
| ***B60W 10/08*** | (2006.01) |
| ***B60W 20/50*** | (2016.01) |

(52) U.S. Cl.

CPC ............ *B60W 20/50* (2013.01); *B60W 10/02* (2013.01); *B60W 10/08* (2013.01); *B60W 2710/021* (2013.01)

(58) Field of Classification Search

CPC ...... B60W 20/50; B60W 10/02; B60W 10/08; B60W 2710/021

USPC .......................................................... 318/434

See application file for complete search history.

(56) References Cited

U.S. PATENT DOCUMENTS

| | | | | |
|---|---|---|---|---|
| 7,116,067 | B2 | 10/2006 | Ma et al. | |
| 8,269,451 | B2 | 9/2012 | Kitanaka | |
| 10,770,987 | B2 | 9/2020 | Kumar et al. | |
| 2018/0309397 | A1* | 10/2018 | De Wergifosse ...... | H02K 17/42 |
| 2020/0062414 | A1* | 2/2020 | Hon ........................ | B64D 31/10 |
| 2020/0328706 | A1* | 10/2020 | Kheraluwala .......... | B64D 31/18 |
| 2023/0191948 | A1* | 6/2023 | Eriksson ................. | B60L 58/21 701/22 |
| 2024/0007040 | A1* | 1/2024 | Trainer .................... | H02J 1/082 |
| 2024/0313688 | A1* | 9/2024 | McLean ................. | H02P 29/024 |

FOREIGN PATENT DOCUMENTS

| | | | |
|---|---|---|---|
| CN | 112928956 | B | 12/2022 |
| JP | 6342043 | B1 | 6/2018 |

* cited by examiner

*Primary Examiner* — Gabriel Agared

(57) ABSTRACT

A method includes receiving an indication of a fault condition in a first winding set of a permanent magnet synchronous (PMS) electric machine that includes the first winding set and a second winding set. The method also includes, in response to receiving the indication of the fault condition, (i) controlling a first power converter that is configured to transfer power between the first winding set and an electrical bus to enter a standby mode, (ii) controlling a mechanical disconnect to disconnect an engine from the electric machine, and (iii) after the mechanical disconnect disconnects the engine from the electric machine, controlling a second power converter that is configured to transfer power between the second winding set and the electrical bus to apply a negative Q-current to the second winding set.

20 Claims, 3 Drawing Sheets

MITIGATING HIGH FAULT ENERGY IN DUAL-WOUND PERMANENT MAGNET SYNCHRONOUS MOTOR DRIVE HYBRID-ELECTRIC PROPULSION SYSTEM

TECHNICAL FIELD

This disclosure generally relates to electric machines. More specifically, this disclosure relates to mitigating high fault energy in a dual-wound permanent magnet synchronous motor drive hybrid-electric propulsion system.

BACKGROUND

A fault condition, such as an alternating current line-to-line short circuit, may arise in a permanent magnet synchronous motor (PMSM) during operation. Even if the PMSM is removed from its power source after detection of the fault, inertia may continue to rotate the PMSM. Until the PMSM stops rotating, a back electro-motive force (EMF) created by the motor windings can continue to produce power across the windings. Due to the fault condition, this may cause a fire hazard due to excessive heat, arcing, sparks, etc. at the location of the fault.

SUMMARY

This disclosure relates to mitigating high fault energy in a dual-wound permanent magnet synchronous motor drive hybrid-electric propulsion system.

In some examples, an apparatus includes a controller configured to receive an indication of a fault condition in a first winding set of a permanent magnet synchronous (PMS) electric machine that includes the first winding set and a second winding set. The controller is also configured, in response to receiving the indication of the fault condition, to (i) control a first power converter that is configured to transfer power between the first winding set and an electrical bus to enter a standby mode, (ii) control a mechanical disconnect to disconnect an engine from the electric machine, and (iii) after the mechanical disconnect disconnects the engine from the electric machine, control a second power converter that is configured to transfer power between the second winding set and the electrical bus to apply a negative Q-current to the second winding set.

In other examples, a method includes receiving an indication of a fault condition in a first winding set of a PMS electric machine that includes the first winding set and a second winding set. The method also includes, in response to receiving the indication of the fault condition, (i) controlling a first power converter that is configured to transfer power between the first winding set and an electrical bus to enter a standby mode, (ii) controlling a mechanical disconnect to disconnect an engine from the electric machine, and (iii) after the mechanical disconnect disconnects the engine from the electric machine, controlling a second power converter that is configured to transfer power between the second winding set and the electrical bus to apply a negative Q-current to the second winding set.

In still other examples, a non-transitory machine readable medium includes instructions that when executed cause at least one processor to receive an indication of a fault condition in a first winding set of a PMS electric machine that includes the first winding set and a second winding set. The non-transitory machine readable medium also includes instructions that when executed cause the at least one processor, in response to receiving the indication of the fault condition, to (i) control a first power converter that is configured to transfer power between the first winding set and an electrical bus to enter a standby mode, (ii) control a mechanical disconnect to disconnect an engine from the electric machine, and (iii) after the mechanical disconnect disconnects the engine from the electric machine, control a second power converter that is configured to transfer power between the second winding set and the electrical bus to apply a negative Q-current to the second winding set.

Any single one or any combination of the following features may be used with the examples above. The second power converter may be controlled to transfer energy to a battery connected to the electrical bus during application of the negative Q-current to the second winding set. After application of the negative Q-current to the second winding set, a determination may be made whether the electric machine is stopped. The electric machine may be determined to be stopped when a speed of the electric machine is zero revolutions per minute (RPM). After a determination that the electric machine is stopped, the second power converter may be controlled to enter a standby mode. The fault condition may be an alternating current (AC) line-to-line fault. The indication of the fault condition may be received from the first power converter. An apparatus may include the controller and at least one of the first or second power converters. The electric machine may be configured to provide mechanical power to the engine when operating in a motor mode and to receive mechanical power from the engine when operating in a generator mode. The electric machine may be configured to provide electrical power to the first and second power converters when operating in a generator mode and to receive electrical power from the first and second power converters when operating in a motor mode. The first and second power converters may be configured to transfer electrical power from the electric machine to the battery via the electrical bus when the electric machine is operating in a generator mode and to transfer electrical power from the battery to the electric machine via the electrical bus when the electric machine is operating in a motor mode.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1A:
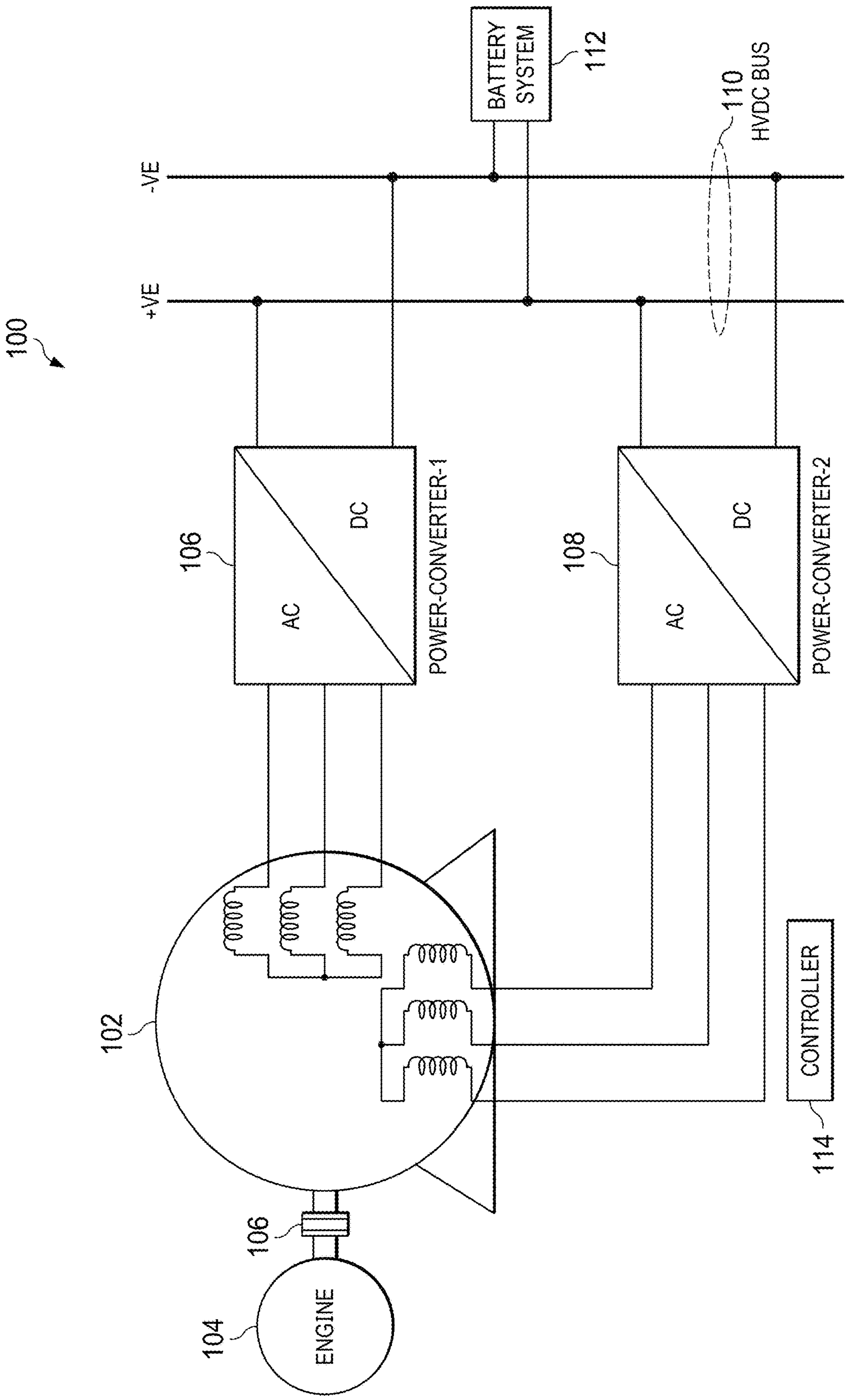
FIGS. 1A-1B illustrate an example hybrid-electric propulsion system in accordance with this disclosure.
Figure 1B:
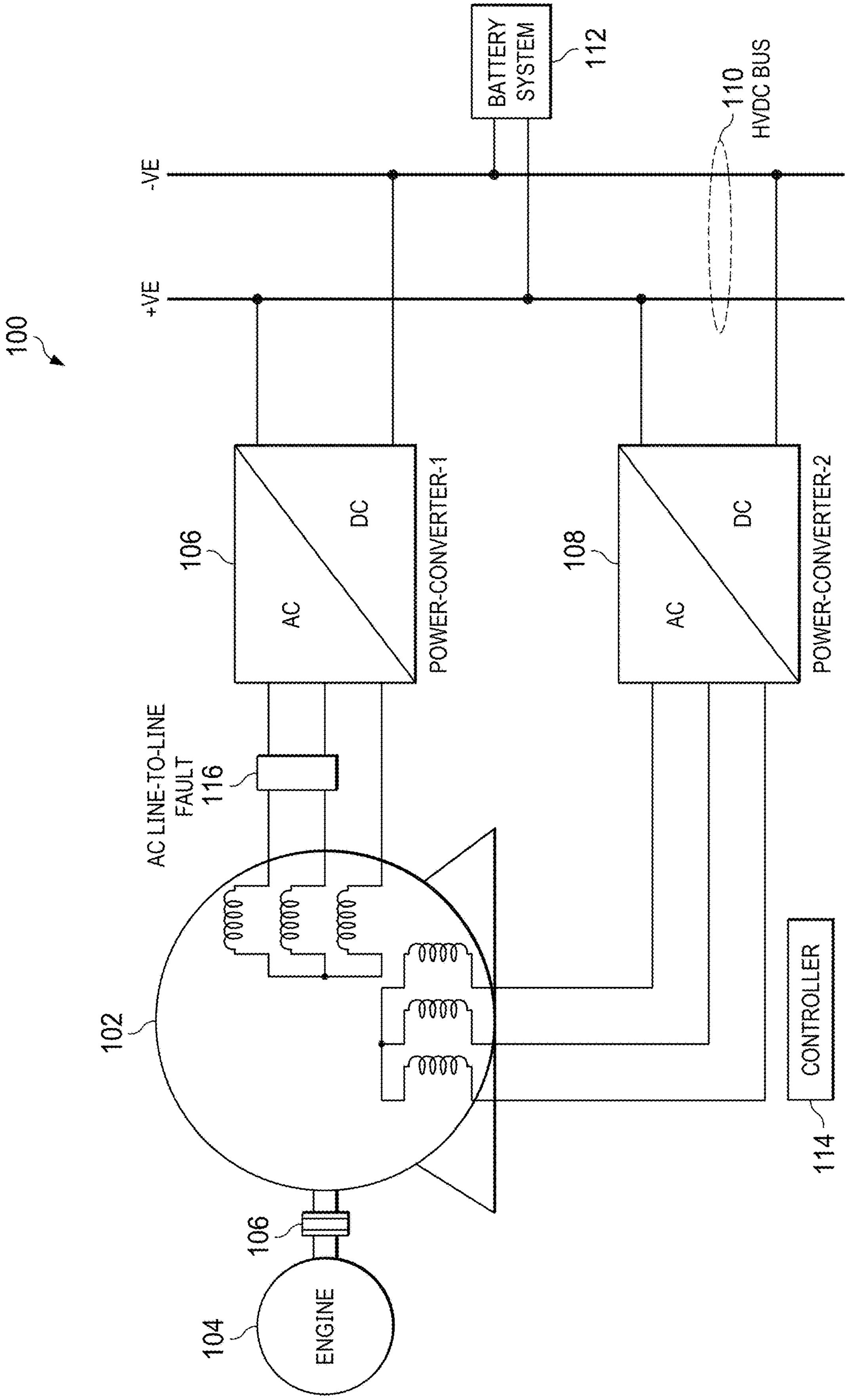
Figure 2:
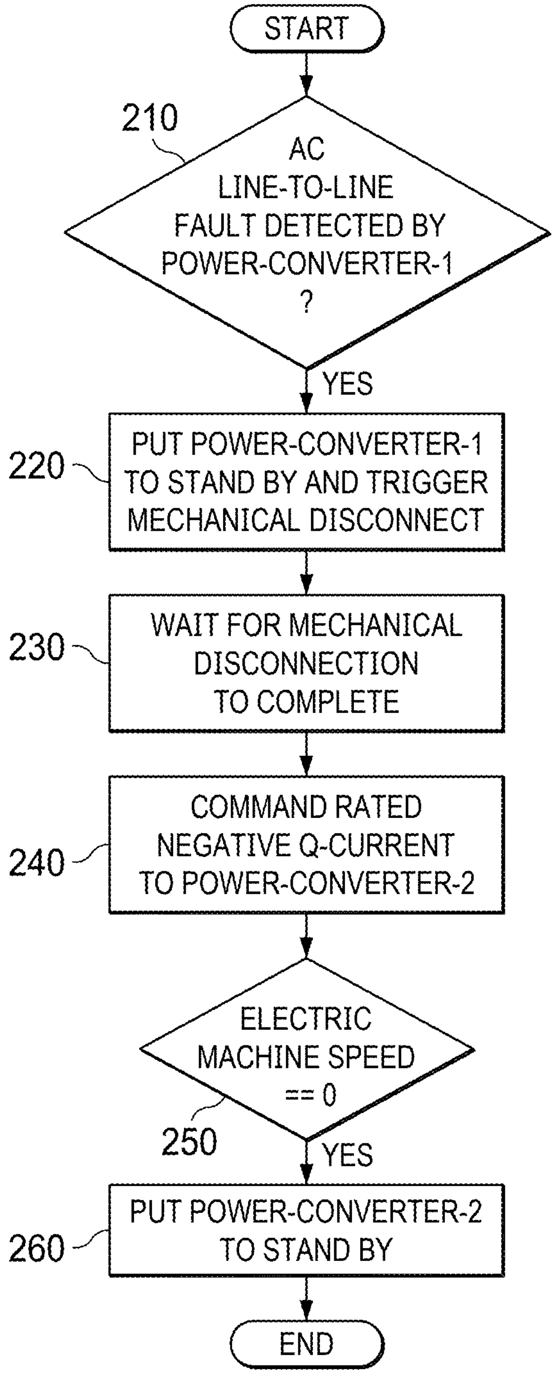
FIG. 2 illustrates an example method of mitigating a fault condition in a hybrid-electric propulsion system in accordance with this disclosure.

FIGS. 1A through 2, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, a fault condition, such as an alternating current line-to-line short circuit, may arise in a permanent magnet synchronous motor (PMSM) during operation. Even if the PMSM is removed from its power source after detection of the fault, inertia may continue to rotate the PMSM. Until the PMSM stops rotating, a back electromotive force (EMF) created by the motor windings can continue to produce power across the windings. Due to the fault condition, this may cause a fire hazard due to excessive heat, arcing, sparks, etc. at the location of the fault.

In some circumstances, such as in a hybrid-electric propulsion system, the propulsion system may utilize a PMSM or another permanent magnet synchronous (PMS) electric machine, such as a generator or motor-generator that is dual-wound. Unlike a single-wound PMS electric machine that includes a single set of three-phase windings, a dual-wound PMS electric machine includes two sets of three-phase windings that are independent of one another. During a fault scenario in one set of windings of a dual-would PMS electric machine, a negative Q-current may be applied to the alternate set of windings. With respect to the PMS electric machine, application of a negative Q-current refers to an electrical power flow from the PMS electric machine to an electrical sink load, such as a battery. This may substantially reduce the time for the faulty motor to stop, thereby reducing the fire hazard caused by the fault condition. The present disclosure provides example embodiments of a hybrid-electric propulsion system that includes a dual-wound PMS electric machine, as well as example embodiments of methods to stop a dual-wound PMS electric machine during a fault condition in a set of the electric machine's windings.

FIGS. 1A-1B illustrate an example hybrid-electric propulsion system 100 in accordance with this disclosure. As shown in FIGS. 1A-1B, hybrid-electric propulsion system 100 includes a dual-wound PMS electric machine 102. In some embodiments, electric machine 102 may be a PMSM, a PMS generator, or a PMS motor-generator. In the example of FIGS. 1A-1B, electric machine 102 is configured to transfer mechanical power between electric machine 102 and an engine 104 via a mechanical disconnect 105. Mechanical disconnect 105 is configured to disconnect electric machine 102 from engine 104 during a fault condition to isolate electric machine 102 from engine 104. For example, mechanical disconnect 105 may be an electronically-controlled clutch that disengages upon receiving a fault signal.

Electric machine 102 is configured to transfer electrical power between electric machine 102 and a first power converter 106 via a first set of three-phase windings. Additionally, electric machine 102 is configured to transfer electrical power between electric machine 102 and a second power converter 108 via a second set of three-phase windings. This configuration provides redundancy. For example, if one power converter 106 or 108 should fail, hybrid-electric propulsion system 100 may continue operating with a single power converter, possibly with reduced performance.

In addition, each power converter 106 and 108 is configured to transfer electrical power between itself and an electrical bus 110. Electrical bus 110 is configured to electrically couple power converters 106 and 108 to battery 112. Battery 112 is configured to transfer electrical power between battery 112 and electrical bus 110. In this manner, battery 112 may serve as a power source and/or a power sink for electric machine 102.

Hybrid-electric propulsion system 100 also includes a controller 114. Controller 114 is configured to monitor hybrid-electric propulsion system 100 for fault conditions and, in response to a fault condition, perform specific actions. For example, in response to a fault condition, controller 114 may control mechanical disconnect 105 to disengage, control one or more of power converters 106 and 108 to enter a standby mode, etc. Controller 114 includes any suitable structure configured to control one or more aspects of hybrid-electric propulsion system 100, such as one or more processing devices. The one or more processing devices may include any suitable number(s) and type(s) of processors or other processing devices in any suitable arrangement. Example types of processing devices include one or more microprocessors, microcontrollers, digital signal processors (DSPs), application specific integrated circuits (ASICs), field programmable gate arrays (FPGAs), or discrete circuitry.

FIG. 1A shows hybrid-electric propulsion system 100 during normal operating conditions. During normal operating conditions, electric machine 102 may operate in a motor mode or a generator mode. During motor mode, power converters 106 and 108 convert direct current (DC) power from battery 112 into alternating current (AC) power, which causes electric machine 102 to generate mechanical power that is transferred to engine 104. During generator mode, engine 104 transfers mechanical power to electric machine 102, which is used to generate AC power. The generated AC power may be converted into DC power by power converters 106 and 108 to charge battery 112 and/or provide electrical power to an accessory device via electrical bus 110. During normal operation, controller 114 monitors hybrid-electric propulsion system 100 for fault conditions.

FIG. 1B shows hybrid-electric propulsion system 100 during a particular fault condition. In the example of FIG. 1B, an AC line-to-line fault 116 is present in the three-phase windings that electrically couple power converter 106 to electric machine 102. AC line-to-line fault 116 may cause excessive energy dissipation while hybrid-electric propulsion system 100 is operating. This fault condition may be detected by controller 114. For example, power converter 106 may detect an imbalance in the three-phase current between power converter 106 and electric machine 102 and may report the imbalance as a fault condition to controller 114. Controller 114 may perform one or more mitigating actions in response to receiving the fault condition from power converter 106. For example, controller 114 may initiate the procedures described in FIG. 2.

Although FIGS. 1A-1B illustrate one example of a hybrid-electric propulsion system 100, various changes may be made to FIGS. 1A-1B. For example, while hybrid-electric propulsion system 100 is shown as having a standalone controller 114, controller 114 may be integrated into another component, or hybrid-electric propulsion system 100 may include additional controllers. As a particular example, controller 114 may be integrated within power converter 106, a similar controller may be integrated within power converter 108, and power converter 106 may be in communication with power converter 108 via their respective controllers. Additionally, it should be understood that controller 114 may provide additional functions besides fault monitoring and response. For instance, controller 114 may provide communication between various components of hybrid-electric propulsion system 100, provide communication with external devices, etc., to control various operating modes of hybrid-electric propulsion system 100.

FIG. 2 illustrates an example method 200 of mitigating a fault condition in a hybrid-electric propulsion system in accordance with this disclosure. For ease of explanation, the method 200 shown in FIG. 2 may be described as being implemented or supported using the controller 114 in the hybrid-electric propulsion system of FIGS. 1A-1B. However, the method 200 shown in FIG. 2 may be implemented or supported by any suitable device(s) and in any suitable system(s).

As shown in FIG. 2, at step 210, a controller (such as controller 114 of FIGS. 1A-1B) monitors for a fault condition in a dual-wound PMS electric machine (such as electric machine 102). If a fault condition (such as AC line-to-line fault 116) is detected, the method proceeds to step 220. Otherwise, the controller continues to monitor for a fault condition.

At step 220, after a fault condition has been detected, the controller controls a power converter associated with the fault condition to enter a standby mode and triggers a mechanical disconnect to disengage. For example, in the case of AC line-to-line fault 116, controller 114 may command power converter 106 to enter standby mode and trigger mechanical disconnect 105 to disengage engine 104 from electric machine 102. At step 230, the controller waits for the mechanical disconnection to complete.

After completion of the mechanical disconnection, at step 240, the controller controls a power converter not associated with the fault condition to apply a negative Q-current to the electric machine. For example, in the case of AC line-to-line fault 116, controller 114 may command power converter 108 to apply a negative Q-current to electric machine 102. Application of the negative Q-current causes a negative torque against any rotational inertia present in the electric machine after the mechanical disconnection, transferring kinetic energy of the electric machine in the form of electrical power to a sink load. For example, application of a negative Q-current to electric machine 102 causes electrical power to flow from electric machine 102 to a load on electrical bus 110 (such as battery 112).

At step 250, the controller monitors the speed of the electric machine. Once the electric machine has stopped (such as when the electric machine speed is zero revolutions per minute [RPM]), at step 260, the controller controls the power converter not associated with the fault condition to enter a standby mode. For example, in the case of AC line-to-line fault 116, controller 114 may command power converter 108 to enter standby mode after controller 114 determines that electric machine 102 has stopped.

Although FIG. 2 illustrates one example of a method 200 of mitigating a fault condition in a hybrid-electric propulsion system, various changes may be made to FIG. 2. For example, while shown as a series of steps, various steps in FIG. 2 could overlap, occur in parallel, occur in a different order, occur any number of times, be omitted, or be replaced by other steps.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:

a controller configured to:

receive an indication of a fault condition in a first winding set of a permanent magnet synchronous (PMS) electric machine that includes the first winding set and a second winding set; and in response to receiving the indication of the fault condition:

control a first power converter that is configured to transfer power between the first winding set and an electrical bus to enter a standby mode;

control a mechanical disconnect to disconnect an engine from the electric machine; and after the mechanical disconnect disconnects the engine from the electric machine, control a second power converter that is configured to transfer power between the second winding set and the electrical bus to apply a negative Q-current to the second winding set.

2. The apparatus of claim 1, wherein the controller is further configured to control the second power converter to transfer energy to a battery connected to the electrical bus during application of the negative Q-current to the second winding set.

3. The apparatus of claim 1, wherein the controller is further configured to:

after application of the negative Q-current to the second winding set, determine whether the electric machine is stopped; and after a determination that the electric machine is stopped, control the second power converter to enter a standby mode.

4. The apparatus of claim 3, wherein the electric machine is determined to be stopped when a speed of the electric machine is zero revolutions per minute (RPM).

5. The apparatus of claim 1, wherein the fault condition is an alternating current (AC) line-to-line fault.

6. The apparatus of claim 1, wherein the controller is further configured to receive the indication of the fault condition from the first power converter.

7. The apparatus of claim 1, wherein the apparatus includes the first power converter.

8. A method comprising:

receiving an indication of a fault condition in a first winding set of a permanent magnet synchronous (PMS) electric machine that includes the first winding set and a second winding set; and in response to receiving the indication of the fault condition:

controlling a first power converter that is configured to transfer power between the first winding set and an electrical bus to enter a standby mode;

controlling a mechanical disconnect to disconnect an engine from the electric machine; and after the mechanical disconnect disconnects the engine from the electric machine, controlling a second power converter that is configured to transfer power between the second winding set and the electrical bus to apply a negative Q-current to the second winding set.

9. The method of claim 8, further comprising:

after application of the negative Q-current to the second winding set, determining whether the electric machine is stopped; and after a determination that the electric machine is stopped, controlling the second power converter to enter a standby mode.

10. The method of claim 8, wherein the fault condition is an alternating current (AC) line-to-line fault.

11. The method of claim 8, wherein the indication of the fault condition is received from the first power converter.

12. The method of claim 8, further comprising:

providing mechanical power from the electric machine to the engine when operating in a motor mode; and providing mechanical power from the engine to the electric machine when operating in a generator mode.

13. The method of claim 8, further comprising:

providing electrical power from the electric machine to the first and second power converters when operating in a generator mode; and providing electrical power from the first and second power converters to the electric machine when operating in a motor mode.

14. The method of claim 8, further comprising:

transferring electrical power from the electric machine to a battery via the first and second power converters and the electrical bus when the electric machine is operating in a generator mode; and transferring electrical power from the battery to the electric machine via the first and second power converters and the electrical bus when the electric machine is operating in a motor mode.

15. An apparatus comprising:

an engine;

an electrical bus;

a battery electrically coupled to the electrical bus;

a mechanical disconnect;

a permanent magnet synchronous (PMS) electric machine, including a first winding set and a second winding set, configured to transfer mechanical power between the electric machine and the engine via the mechanical disconnect;

a first power converter configured to transfer power between the first winding set and the electrical bus;

a second power converter configured to transfer power between the second winding set and the electrical bus; and a controller configured to:

receive an indication of a fault condition in the first winding set; and in response to receiving the indication of the fault condition:

control the first power converter to enter a standby mode;

control the mechanical disconnect to disconnect the engine from the electric machine; and after the mechanical disconnect disconnects the engine from the electric machine, control the second power converter to apply a negative Q-current to the second winding set.

16. The apparatus of claim 15, wherein the controller is further configured to control the second power converter to transfer energy to the battery during application of the negative Q-current to the second winding set.

17. The apparatus of claim 15, wherein the controller is further configured to:

after application of the negative Q-current to the second winding set, determine whether the electric machine is stopped; and after a determination that the electric machine is stopped, control the second power converter to enter a standby mode.

18. The apparatus of claim 17, wherein the electric machine is determined to be stopped when a speed of the electric machine is zero revolutions per minute (RPM).

19. The apparatus of claim 15, wherein the fault condition is an alternating current (AC) line-to-line fault.

20. The apparatus of claim 15, wherein the indication of the fault condition is received from the first power converter.

* * * * *